Figures 1, 2:
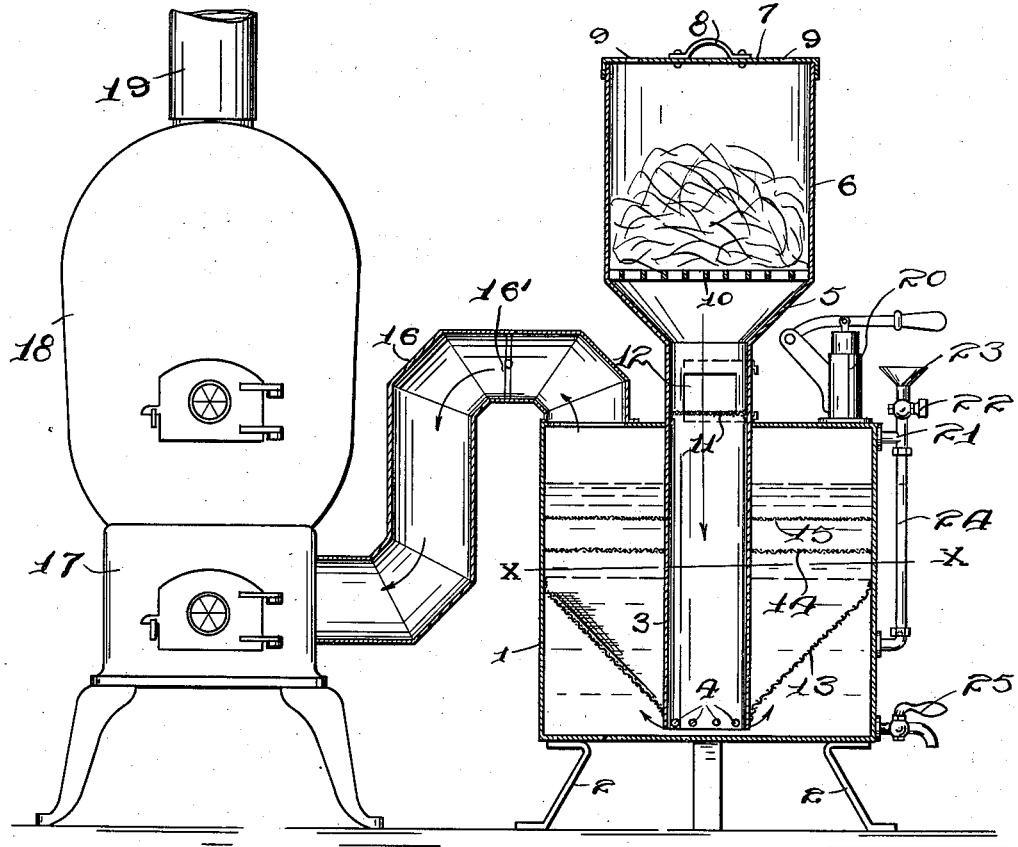

W. H. SWETT.
TOBACCO SMOKE ABSORPTION APPARATUS.
APPLICATION FILED JUNE 5, 1911.

1,018,996.

Patented Feb. 27, 1912.

Witnesses
H. A. Stock.
E. W. Cady

Inventor
William Henry Swett
By C. E. Vrooman,
his Attorney

UNITED STATES PATENT OFFICE.

WILLIAM HENRY SWETT, OF BERKELEY, CALIFORNIA, ASSIGNOR TO W. H. STENGER, OF BERKELEY, CALIFORNIA.

TOBACCO-SMOKE-ABSORPTION APPARATUS.

1,018,996.  Specification of Letters Patent.  Patented Feb. 27, 1912.

Application filed June 5, 1911. Serial No. 631,234.

*To all whom it may concern:*

Be it known that I, WILLIAM HENRY SWETT, a citizen of the United States, residing at Berkeley, in the county of Alameda and State of California, have invented certain new and useful Improvements in Tobacco - Smoke - Absorption Apparatus, of which the following is a specification.

This invention relates to apparatus for producing solutions for destroying insects and refers especially to that class of solutions with insect destroying properties which are used for spraying plants.

The invention has for its object to provide an improved apparatus for preparing solutions for destroying insects, said apparatus being constructed and arranged as hereinafter set forth and claimed.

This invention has special reference to the production of an insect destroying solution which contains ingredients employed for spraying plants.

Referring to the accompanying drawings:—Figure 1 is a view in elevation and partly in vertical section of an apparatus constructed in accordance with this invention. Fig. 2 is a horizontal section on the line X—X of Fig. 1.

In carrying out the invention a receptacle 1 of suitable size and shape is employed which is mounted on supports 2 and has extending through its top a pipe 3 which terminates at a slight distance from the bottom of the receptacle 1 and is open at its lower end and provided with holes 4 whereby the gas may be partly broken up as it leaves the pipe 3. The upper end of the pipe 3 projects a short distance above the top of the receptacle 1 and is formed with a funnel 5 from which projects upward a combustion chamber or receptacle 6 provided with a suitable cover 7 having a handle 8 and a number of vent holes 9. The bottom of the receptacle 6 is provided with a grate 10.

Located in the pipe 3 slightly above the top of the receptacle 1 is a diaphragm 11 of reticulated material for the passage of air which serves to catch the ashes dropping through the grate 10 and from which said ashes can be removed through a door 12 in the side of the pipe 3. Secured to the lower end of the pipe 3 above the holes 4 and extending from the inner side of the receptacle is a conical screen 13 which serves to cause the bubbles to move away from the center. Located at a little distance above the top of the conical screen 13 are two screens 14 and 15 extending from side to side in the receptacle, the screen 15 being of finer mesh than the screen 14. Communicating with the top of the receptacle 1 is a pipe 16 which may be closed by a damper 16', the pipe 16 communicating with the ash pit 17 below the grate of a stove 18 having an escape pipe 19.

The apparatus is operated as follows:— Tobacco being burned in the combustion chamber 6 and the drafts in the ash pit and fire box of the stove 18 being closed, a suction is created from the receptacle 1 through the pipe 19, thereby maintaining a constant flow of air and gas from the combustion chamber 6 down through the tube 3 to the ash pit 17 of the stove 18. This flow of air maintains the combustion in the chamber 6 and the receptacle 1 being filled with water, as the gas from the combustion chamber passes through the liquid in the receptacle 1 the harmful ingredients of tobacco such as nicotin enter into solution with the liquid. During warm weather when the sun is shining the apparatus may be operated by natural draft. This may be accomplished by extending the pipe 19 to a sufficient height and at the same time painting it black, while the apparatus is located in a cool place in the shade. By regulating the height of the water in the receptacle 1 the apparatus may be used with any available amount of draft. When only a small quantity of the solution is to be made and it is not desired to start a fire in the stove 18 a suction pump 20 may be employed for exhausting the air in the receptacle 1, said pump being mounted on the top of the latter. In conjunction with the exhaust pump 20, an air pipe 21 is employed located on the side of the receptacle 1 and provided with a cock 22 and a filling tube and funnel 23, and a gage 24. A draw off cock 25 is employed with the receptacle 1.

What I claim is:—

1. In a tobacco-smoke absorption apparatus, a receptacle for containing liquid, a vertical pipe projecting through the top of said receptacle and having its lower open end terminating adjacent to the bottom of said receptacle, a combustion chamber having an open lower end, and a grating above the same, said combustion chamber being mounted on the upper end of said vertical pipe, and means for causing a downward draft from said combustion chamber and up through the liquid containing receptacle and above the same.

2. In a tobacco-smoke absorption apparatus, a liquid containing receptacle, a vertical pipe projecting through the top of said receptacle and having its lower open end adjacent to the bottom of said receptacle, a combustion chamber with a grating, and an open lower end mounted on the upper end of said vertical pipe, screens located in said liquid containing receptacle between said pipe and the sides of said receptacle, and means for causing a draft downward from said combustion chamber through said vertical pipe and upward in said liquid containing chamber and out of the same.

3. In a tobacco-smoke absorption apparatus, a liquid containing receptacle, a vertical pipe projecting through the top of said receptacle, and open at both ends with its lower end adjacent to the bottom of said receptacle and having perforations in the side of said end, a cone shaped screen above said holes between said pipe and the sides of the receptacle, and horizontal screens located in said receptacle above said cone shaped screen, a combustion chamber having a lower open end with a grating mounted on the upper end of said vertical pipe, and means for causing a draft downward from said combustion chamber through said vertical pipe, and upward through said liquid containing chamber and out of the same.

4. In a tobacco-smoke absorption apparatus, a liquid containing receptacle, a vertical pipe projecting through the top of said receptacle, and open at both ends, with its lower open end adjacent to the bottom of said receptacle, screens located in said receptacle, a reticulated diaphragm adjacent to the upper end of said pipe, a door adjacent to said diaphragm in said pipe, a combustion chamber having a lower open end, and a grating mounted above the top of the upper end of said pipe, a stove, and a pipe connecting the ash pit of said stove with the top of said liquid containing receptacle.

5. A tobacco-smoke absorption apparatus comprising a liquid containing receptacle, a vertical pipe open at each end projecting through the top of said receptacle and having its lower end adjacent to the bottom of said receptacle, screens located in said receptacle, a combustion chamber with a lower open end and a grating mounted on the top of said vertical pipe, a filling pipe, and a cock connected with the upper end of said receptacle, and an air pump on the top of said receptacle.

In testimony whereof I affix my signature in presence of two witnesses.

WILLIAM HENRY SWETT.

Witnesses:
H. C. SCHROEDER,
F. J. SCHROEDER.